Sept. 7, 1965  M. H. PANNING  3,205,016
CONVEYORS
Filed Dec. 11, 1962  2 Sheets-Sheet 1

INVENTOR.
MARTIN H. PANNING
BY
ATTORNEY

Sept. 7, 1965      M. H. PANNING      3,205,016

CONVEYORS

Filed Dec. 11, 1962      2 Sheets-Sheet 2

INVENTOR.
MARTIN H. PANNING
BY
ATTORNEY

United States Patent Office 3,205,016
Patented Sept. 7, 1965

3,205,016
CONVEYORS
Martin H. Panning, Thiensville, Wis., assignor to
Blower Application Company
Filed Dec. 11, 1962, Ser. No. 243,838
6 Claims. (Cl. 302—23)

This invention relates to improvements in conveyors, and more particularly to a tube-like conveyor actuated by pneumatic means. The invention is particularly directed to a conveyor for moving small articles or products through use of air flow.

The major purpose of the present invention is to create a pneumatic conveying system which withdraws air from a conveying duct so as to create suction forces tending to pull conveyed articles through the duct while using the withdrawn air to impart pushing forces at increased velocities on the articles, the system being so designed that it may be installed at any point along the length of a pneumatic conveying tube and being so designed that two or more such units as herein described may be placed at spaced intervals along a length of conveying tube so as to create desired conveying forces, the system being such that a substantially constant flow area through the conveying conduit is maintained.

Still another purpose of the invention is to arrange a pneumatic conveyor without any internal obstructions with a conveying tube, and so arranged as to enable use of one or more pressure fans or the like to provide the air flow.

Other and further objects of the invention will become more apparent as the description proceeds, when taken in conjunction with the accompanying drawings, in which.

Similar characters of reference indicate corresponding parts throughout the several views, and referring specifically now to the same, the character 10 designates a conveying conduit of tube-like form. Conduit 10 may be cylindrical in shape as shown, or may be of other shapes.

Duct 10 may be of any desired or convenient length and has an inlet 11 for receiving the particles being conveyed and an outlet 12 for their ejection.

Figure 1:
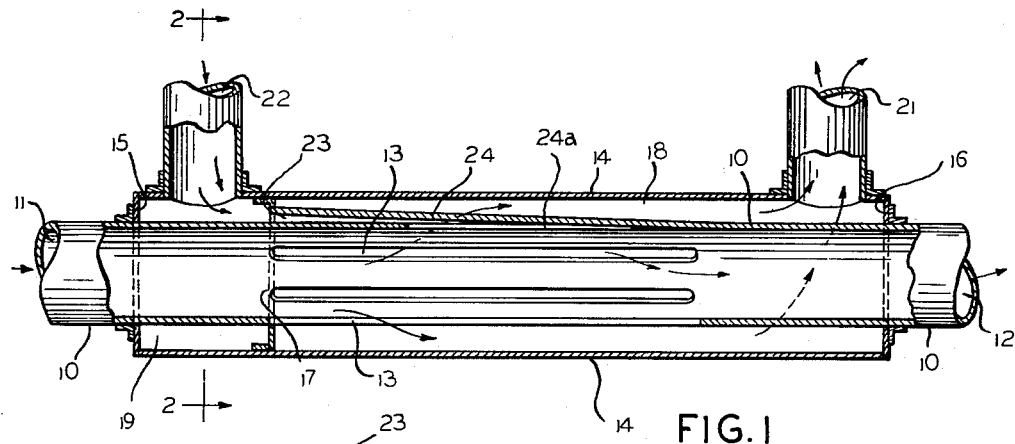
FIGURE 1 is a longitudinal, cross sectional view of one embodiment of the invention.
Figure 2:
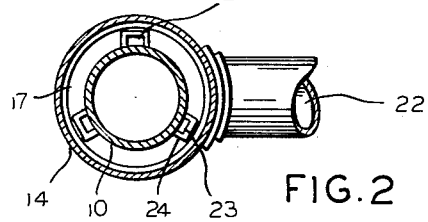
FIGURE 2 is a cross section of the device shown in FIGURE 1 taken at the section line 2—2 therein.

Referring to FIGURES 1 and 2, I show a plurality of elongated suction slots 13, which may be straight or tapered, and which are formed in the peripheral wall of the tube 10.

Surrounding that portion of the tube 10 having the slots 13 is a shell-like enclosure 14, which defines an air manifold around this portion of the tube.

The shell-like enclosure 14 has end walls 15 and 16 sealing it with the outer periphery of the tube 10. An intermediate partition 17 divides the interior of the enclosure into a suction chamber 18 and a pressure chamber 19. The suction chamber is thus in direct communication with slots 13, while the pressure chamber is not. The suction chamber 18 has an air outlet tube 21 normally connected to an inlet of a fan (not shown) or any other type of air mover. The pressure chamber 19 has an air inlet tube 22 connected to the discharge of a fan (not shown), pump or any other type of air mover.

The assembly includes means for directing air from the pressure chamber to the conduit. In FIGURES 1 and 2, for example, flow confining surfaces 24 are spaced around conduit 10 and are connected between partition 17 and conduit 10. These surfaces are channel-like in cross section and extend at a shallow angle to the wall of conduit 10. In effect they define jet-like nozzles for directing air from openings 23 in partition 17 to openings 24a in the wall of conduit 10. The tapered cross section of these surfaces produces a venturi-like action in increasing the velocity of the air passing to conduit 10. These nozzles allow air to be forced at high velocity into the tube 10 through the openings 23.

The surfaces 24 are spaced circumferentially of conduit 10 as is seen in FIGURE 2 and are located in the areas of the conduit between the air exit slots 13.

Figure 3:
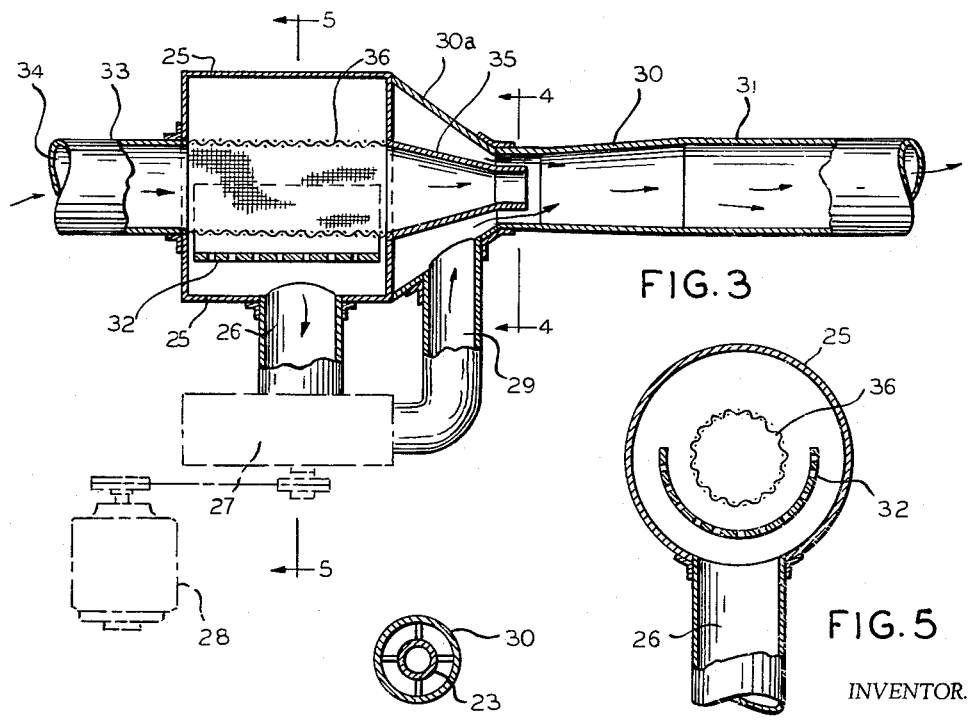
FIGURE 3 is a longitudinal, cross sectional view of a modified construction of the conveyor unit.

FIGURE 3 illustrates a modified construction in which the conveyor tube portion 33 receives the product being conveyed from an intake 34. The tube 33 is tapered down to a venturi-like cross section 35. The end portion 35 is aligned with and opens into conduit portion 30 which has an expanding cross section leading to conduit portion 31. A screen section 36 is formed in the tube 33 which provides an air outlet to a surrounding manifold defined by shell-like enclosure 25. Enclosure 25 has an outlet 26 leading to a blower 27, shown in phantom, and driven by any conventional driving means shown as a motor 28.

The blower 27 conveys the air from the manifold 25 forming a part of the tube 33 to a pressure chamber 30a surrounding portion 35. The wall of tube 30 with the end of tube portion 35 defines an annular inlet to conduit portions 30 and 31 from the pressure chamber within wall 30a. The flow confining surfaces again define means for increasing the air velocity as the air is directed at a shallow angle to the axis of the conveying conduit 31.

If desired, a perforated semi-cylindrical plate shown as 32 may be employed to stabilize the air leaving the shell 25 through the tube 26.

The suction slots may be screened to prevent small pellets from entering the suction chamber. The device is limited to conveying materials large enough so that they will not pass through the suction slots into the suction chamber. Any material being conveyed by this unit is accelerated by the air stream to such a velocity that inertia carries it past the suction slots into the pressure zone created by the jets.

Figure 6:
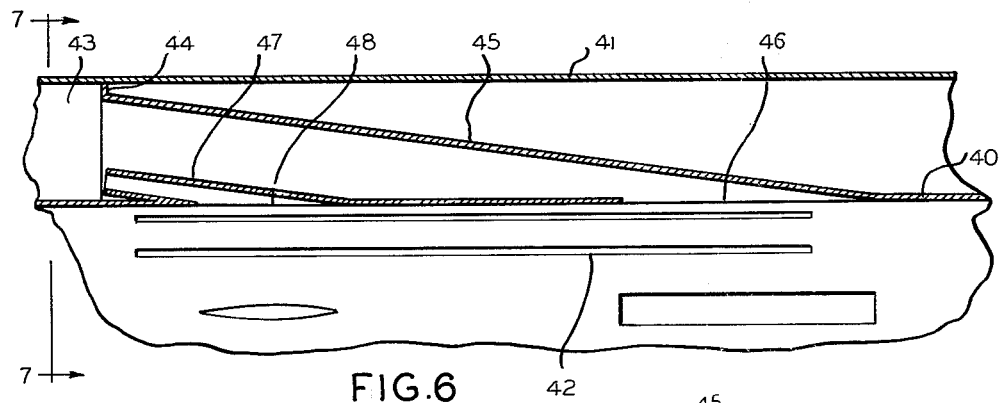
FIGURE 6 is a cross sectional illustration of a modified form of system and particularly illustrating the use of a plurality of jet-like air inlets for the conveying tube.

FIGURE 6 illustrates a modified form of jet-like air inlets. In FIGURE 6, for example, the conveying conduit is designated at 40. The air manifold, which surrounds a portion of the conveying conduit 40, is designated at 41. Elongated air withdrawal slots 42 are formed in the conveying conduit 40 in a manner similar to the slots 13 of FIGURE 1. One end of the manifold 41 is provided with a pressure chamber 43 which may have a suitable air inlet duct connected thereto. Manifold 41 is separated from the chamber 43 by the partition 44. Suitable means may be provided for withdrawing air from the manifold 41 and then delivering the air to the pressure chamber 43 in a manner similar to that previously described.

In FIGURE 6, a plurality of jet-like openings are provided along the length of the conveying duct 40. For example, a nozzle tube of generally rectangular cross section may lead from partition 44 to the conduit 40.

The upper flow confining surface of this tube 45 is inclined to the axis of the duct 40 at a shallow angle. Tube 45 terminates in an elongated aperture 46 in the wall of the conduit 40, the arrangement being such that air may be delivered from the pressure chamber 43 through tube 45 and to the interior of duct 40 and through the lot 46. A second smaller tube 47 is positioned within tube 45 and is positioned so as to receive air from the pressure chamber 43. This second tube also directs air along a shallow angle with respect to the axis of duct 40, through slot 48.

Figure 7:
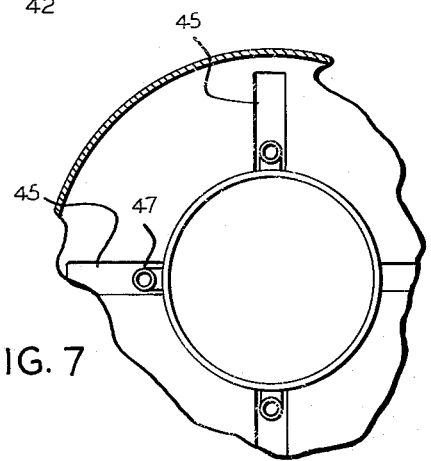
FIGURE 7 is a sectional illustration taken on the section line 7—7 of FIGURE 6.

Thus, in FIGURES 6 and 7, two air inlet slots 48 and 46 are spaced along the wall of the duct. A number of these air inlet tube assemblies may be spaced around the circumference of duct 40, as is seen in FIGURE 7.

Figure 8:
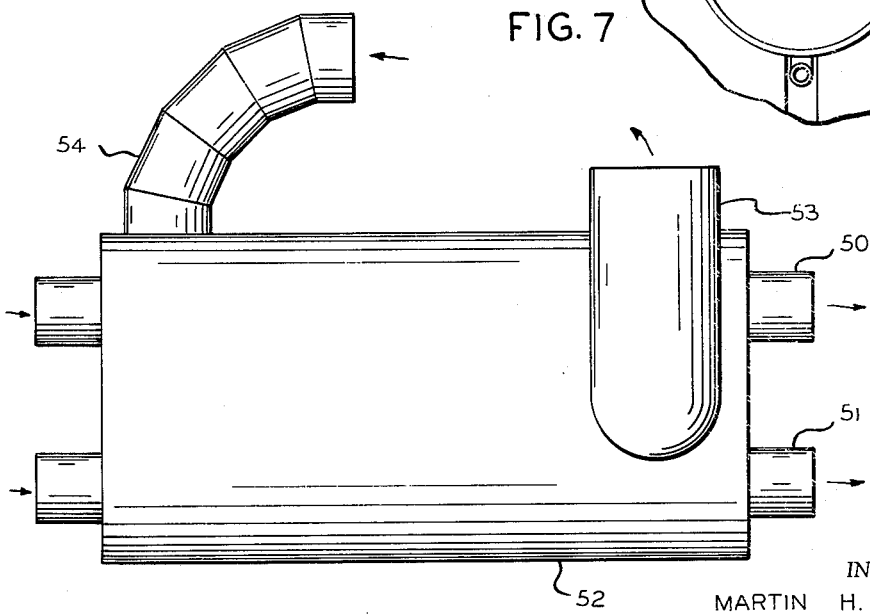
FIGURE 8 is a schematic illustration of a plurality of conveying conduits utilizing the system as herein described but with a single air manifold.

In FIGURE 8, the principles of the invention are applied to a plurality of conveying ducts. In FIGURE 8, for example, a pair of ducts are illustrated at 50 and 51. A single manifold 52 surrounds both ducts. Air is exhausted from the manifold 52 through an outlet duct 53 by means of a suitable fan or blower. This same air that is exhausted is redelivered to the pressure end of the manifold as through a duct 54. The interior of the manifold 52 is provided with a partition separating the pressure space at the pressurized end of the manifold, as for example, that end supplied with air from duct 54, and includes air inlet tubes, as described and illustrated in FIGURES 1 and 7, inclusive, leading from this pressurized space to the interiors of the conveying conduits 50 and 51.

The use and operation of the invention are as follows. The air withdrawal and air supply systems as herein illustrated are particularly applicable to pneumatic conveying systems especially adapted to convey articles such as, for example, plastic articles, pellets, or the like, as distinguished from material in a finely powdered or granulated form. The air manifold systems as herein illustrated and described may be applied at any point in the length of the conveying conduit between the inlet and outlet thereof. In the case of relatively short conduits, a single manifold may be used, whereas with long conduits two or more manifold assemblies may be spaced along the length of the conduits, it being understood that such number of manifold assemblies are used as are necessary to create the necessary propulsion forces through the duct.

The manifold systems as herein described, use only the air which is within the duct to create the pushing and pulling forces within the conduit. The same amount or volume of air withdrawn from the conduit is redelivered to the conduit, but at a greater velocity and pressure than the air withdrawn. The inlet area to the conduit from the jet-like tubes 24 is less than the outlet area from the slots 13, thus, resulting in air being supplied to the duct at a higher pressure and velocity than the withdrawn air, with a consequent gain of propelling forces through the duct. The air entering the duct through the jet-like tubes 24 is directed along a very slight or shallow angle with respect to the axis of the conduit, thereby tending to maintain a film of air along the interior wall of the conduit while not impeding flow of articles through the conduit. In the system of FIGURE 1, the cross sectional flow area of the conduit 10 is maintained constant since no internal obstructions are present in the conduit. Thus, the system of FIGURES 1 and 2 may be easily applied to a more or less standard form of conduit by affixing the jet tubes thereto and the manifold in surrounding relation.

Figure 4:
FIGURE 4 is a cross section of the device shown in FIGURE 3 taken at the section line 4—4 therein.
Figure 5:
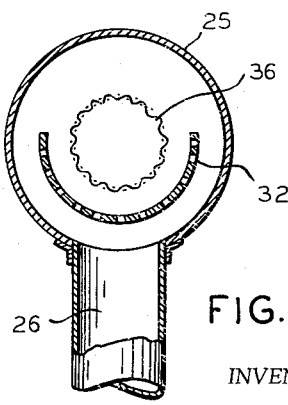
FIGURE 5 is a cross sectional view of the device shown in FIGURE 3 taken at the section line 5—5 therein.

In the form of the invention illustrated in FIGURE 4, the tube portion 35 does have a reduced cross sectional area, but still the system lacks any internal obstructions and the reduction in cross sectional area is not such as to impede flow of articles through the conduit system.

The total amount of air or conveying medium flowing in the conduit is greater than the amount of air withdrawn and then returned to the conduit. Since the systems herein described use only air flowing within the conduit to increase the flow velocity, essentially the same flow velocity is maintained throughout the conduit, when the conduit is a uniform cross sectional size throughout its length. In this regard, it will be seen that the quantity of air entering the suction end of the duct or conduit is equal to the quantity of air leaving the discharge end of the conduit at any given instant.

This is distinct from systems using the addition of outside air to the conduit to increase flow velocity because in those systems the quantity of air leaving a conduit at any given instant is greater than the quantity of air entering the suction end. In those systems, therefore, the exit velocity is greater than the suction end velocity if a conduit of constant cross sectional flow area is used. If uniform flow velocity throughout the conduit is desired in those systems, the duct must be larger from the point of air admission to the discharge end than the duct portion from the suction end to the point of admission in order to compensate for the addition of outside air.

Thus, by using a portion of the air flowing within the conduit, rather than outside air, the conduit size may be substantially uniform throughout while maintaining uniform flow velocity throughout irrespective of the number of systems as herein described connected in series.

Both embodiments as herein described take advantage of the venturi action created by the gradually reduced cross section of the air inlets to the conduit to increase flow velocity within the conduit.

In all forms of the invention, the size of the air outlet slots or apertures from the conduits are such that the articles may not pass through them. The outlet area is, however, sufficiently large that air is exhausted from the conduit into its surrounding manifold in what may be termed as a natural expansion tendency of the air flowing through the duct. The inertia of the articles being conveyed, together with the propulsion forces created by the high velocity, high pressure inlet air tends to maintain the flow direction of the articles through the duct, notwithstanding the constant exhaust of air from the duct.

It should be understood that the systems herein described are intended for use with air as the conveying medium, the principles of the invention may be used with other gaseous mediums.

Whereas, I have shown and described an operative form of the invention it should be understood that this showing and description thereof should be taken in an illustrative or diagrammatic sense only. There are many modifications in and to the invention which will fall within the scope and spirit thereof and which will be apparent to those skilled in the art. The scope of the invention should be limited only by the scope of the hereinafter appended claims.

I claim:

1. A conveying system including a conveying conduit adapted to have a gaseous medium therein, said conduit having a substantially uniform cross-sectional area throughout a predetermined length thereof, a manifold surrounding said length of said conduit between the inlet and outlet ends of said conduit, said manifold having an inlet from a pressure source of gaseous medium at its upstream end and a return to said pressure source at its downstream end, a partition in said manifold between said inlet and return, nozzle means from said partition to said conduit to direct said gaseous medium from said pressure source downstream of said conduit, and apertures in said conduit downstream of said partition for delivery of a part of said gaseous medium to said return.

2. A conveying system including an elongated tube-like conveying structure having an inlet and outlet, means for withdrawing a gaseous medium from said conveying structure so as to create suction forces within said structure, and means for returning the withdrawn medium adjacent to the point of withdrawal at increased pressures and velocities by nozzle means in a direction toward the outlet of said structure, said withdrawing means being in communication with said structure through elongated openings in said conveying structure, said returning means being in communication with said structure through elongated openings extending alongside said first named openings in said structure.

3. The structure of claim 2 wherein said returning means includes a plurality of nozzles spaced around said conveying structure and in communication with said second named openings.

4. The structure of claim 2 wherein said returning means includes flow confining surfaces constructed and arranged to direct air along said conveyor structure and at a relative shallow angle with respect to the axis of said structure.

5. The structure of claim 2 wherein said returning means includes plural nozzles spaced longitudinally of said conveying structure and spaced around said tube-like structure, first named openings being in the form of slots spaced around said conveying structure and in wall portions of said structure between said nozzles.

6. The structure of claim 2 characterized by and including a plurality of elongated tube-like conveying structures similarly formed and spaced along the length of a pneumatic conveying system.

References Cited by the Examiner
UNITED STATES PATENTS

| | | | |
|---|---|---|---|
| 137,507 | 4/73 | Thayer | 302—25 |
| 138,175 | 4/73 | Merrill | 302—23 |
| 140,017 | 6/73 | Cram | 302—25 |
| 1,232,393 | 7/17 | Piper | 302—24 |
| 2,624,641 | 1/53 | Smith | 302—2 |

FOREIGN PATENTS

| | | |
|---|---|---|
| 1,099,520 | 3/55 | France. |

SAMUEL F. COLEMAN, *Primary Examiner.*

ANDRES H. NIELSEN, ERNEST A. FALLER,
*Examiners.*